(12) United States Patent
Antopolsky et al.

(10) Patent No.: US 9,949,105 B1
(45) Date of Patent: Apr. 17, 2018

(54) METHOD FOR MANAGING INCOMING CALLS IN MOBILE DEVICES

(71) Applicants: Eliahu Antopolsky, Zichron Yaakov (IL); Meir Dahan, Adi (IL)

(72) Inventors: Eliahu Antopolsky, Zichron Yaakov (IL); Meir Dahan, Adi (IL)

(*) Notice: Subject to any disclaimer, the term of this patent is extended or adjusted under 35 U.S.C. 154(b) by 0 days.

(21) Appl. No.: 15/691,937

(22) Filed: Aug. 31, 2017

Related U.S. Application Data

(63) Continuation-in-part of application No. 15/406,739, filed on Jan. 15, 2017.

(51) Int. Cl.
| | |
|---|---|
| *H04M 11/04* | (2006.01) |
| *H04W 4/22* | (2009.01) |
| *H04M 3/42* | (2006.01) |
| *H04W 68/02* | (2009.01) |

(52) U.S. Cl.
CPC ......... *H04W 4/22* (2013.01); *H04M 3/42059* (2013.01); *H04W 4/90* (2018.02); *H04W 68/02* (2013.01); *H04M 2242/04* (2013.01)

(58) Field of Classification Search
None
See application file for complete search history.

(56) References Cited

U.S. PATENT DOCUMENTS

| | | | |
|---|---|---|---|
| 2008/0089503 A1* | 4/2008 | Crockett | H04M 3/42153 379/201.03 |
| 2011/0034154 A1* | 2/2011 | Maxfield | H04M 3/436 455/414.1 |

* cited by examiner

*Primary Examiner* — Idowu O Osifade

(57) ABSTRACT

A method that enables a callee to manage incoming voice calls in a way that in a period of time that he sets the method prevents the operation of the alerts mechanisms of his mobile device. In case of an incoming voice call the method sends a notice to the caller mobile device notifying that the callee prefers to receive now only urgent voice calls. The method enables the caller to decide according to his sole discretion whether to complete this voice call.

3 Claims, 3 Drawing Sheets

METHOD FOR MANAGING INCOMING CALLS IN MOBILE DEVICES

RELATED APPLICATIONS

This application is a continuation in part of U.S. patent application Ser. No. 15/406,739 filed on 15 Jan. 2017.

TECHNICAL FIELD

The present invention refers generally to a method that may be performed by a processor running on mobile devices or on computers of phone service providers, which enables users to manage incoming voice calls.

BACKGROUND ART

Many users of mobile devices that are designed to receive voice calls are in dilemma whether to put their mobile device on mute mode when they are in places and situations when it is customary to put the mobile device on mute mode, such as a meeting, trying to take a nap or in a movie, while at the same time they prefer not to miss important and emergency incoming voice calls. The dilemma of almost every average user is whether to leave the mobile device on the regular mode on these specific times and to receive unimportant incoming voice calls, which are disturbing at that time, or to put it on mute and to miss important and emergency voice calls. The present invention offers a good and effective response to this dilemma.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
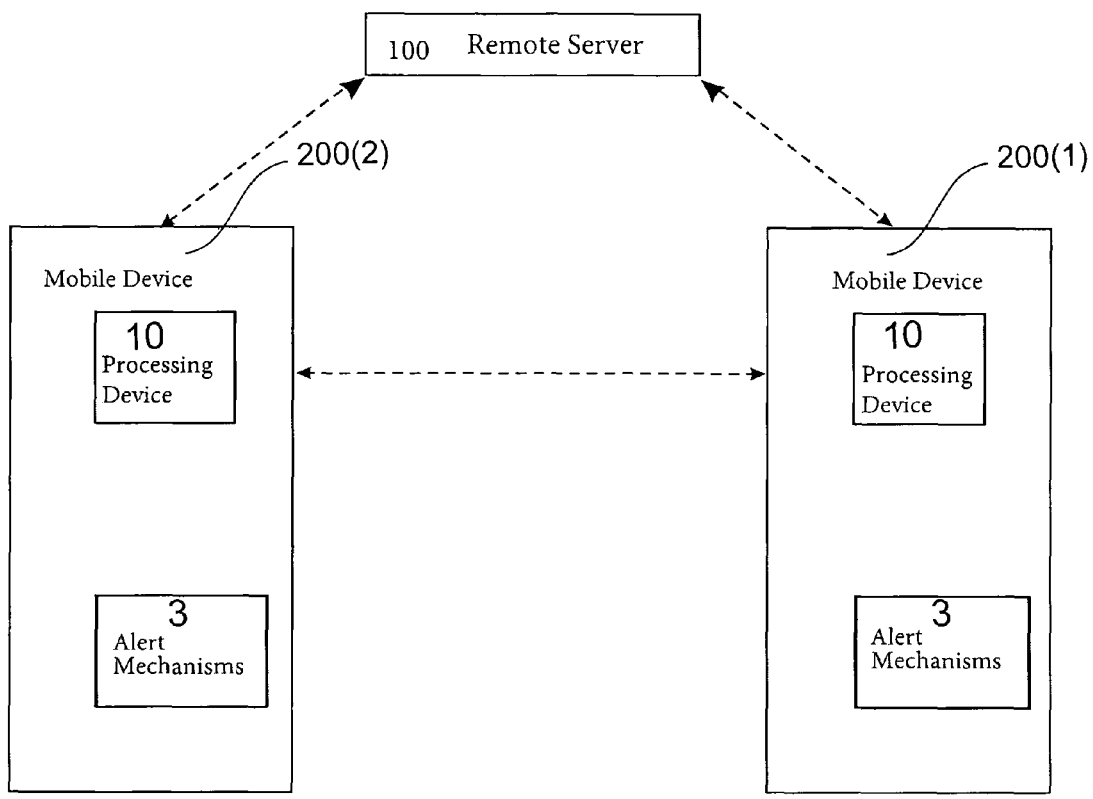
FIG. 1 is a block diagram that shows two mobile devices (200), one of them is the callee mobile device (1) and the second one is the caller mobile device (2).

For the sake of fluency we will start with some definitions. The terms hereinafter have the meanings as stated beside each of them in this patent application and in the claims as well. These terms may be used in the application and the claims in plural or singular.

The term "mobile device" refers to any kind of device which is designed to receive voice calls, by cellular networks or internet, such as smartphones, tablet computers, wearable computers, etc.;

The term "voice call" refers to phone calls which may be executed also over cellular networks and calls over the internet by smartphone applications such as Viber, WhatsApp, FaceTime, Skype and Messenger;

The "caller" refers to a person who performs a voice call by a mobile device;

The "callee" refers to a person who receives a voice call to a mobile device;

The term "user" refers to a callee when this user receives a voice call in his mobile device or to a caller when this user performs a phone call by his mobile device;

The term "caller mobile device" refers to the mobile device that performs an outgoing voice call;

The term "callee mobile device" refers to the mobile device that receives an incoming voice call;

The term "processing device" refers to a processing device on a remote server, or on a mobile device, or on both of them. The processing device may include computing device;

The term "alerts mechanisms" refers to the ringing, vibrating and screen display mechanisms of mobile devices, which usually are activated as a result of incoming voice calls.

The main object of the present patent application is to provide a method performed by processing devices (10) that enables users of mobile devices to manage incoming voice calls. A smartphone application may be used as a framework for the overall operation of the method and for the sake of fluency we will use the terms "smartphone application" and "method" hereinafter in this connection and as having in general the same meanings. Users of mobile devices can download the smartphone application to their mobile devices. The smartphone application performs the method on the processing devices (10), which may be processing devices in the mobile devices, in remote servers (100) or on both.

The method performed by processing devices (10) running on mobile devices (200) and the remote server (100). The users of the mobile devices (200) may perform a voice call and in these cases these users are callers and their mobile devices are callers mobile devices (2), or may receive a voice call and in these cases these users are callee and their mobile devices are callee mobile devices (1). The method includes the following features:

(a) Enabling the user to activate the method regarding his mobile device for a period of time that this user sets. In this case we may refer to this user as a callee and to his mobile device as a callee mobile device (1). The method enables the callee to manage incoming voice calls to his callee mobile device (1) in a way that incoming voice calls will not activate the alerts mechanisms of his mobile device but only after a decision of the caller that the voice call is urgent, a decision that based on the sole discretion of the caller.

(b) In response to the activation of the method on the callee mobile device (1), the method prevents the operation of the alerts mechanisms (3) of the callee mobile device (1) during this period of time that the callee sets.

(c) In response to the activation of the method regarding the callee mobile device (1), the method sends to the remote server (100) via internet the information regarding the phone number of the callee mobile device (1) and regarding the period of time that he sets. The term "phone number" means the phone number of the callee mobile device or any identification address in cases of messengers, Skype and that kind of relevant calling programs and providers.

(d) Storing in the remote server the information regarding the phone number of the callee mobile device and listing for said period of time this phone number as a phone number on an urgent mode.

(e) in response to execution of a voice call from the caller mobile device to another phone number, the method sends via internet from the caller mobile device (2) to the remote server (100) the information regarding the another phone number. The term "another phone number" means the phone number of the callee mobile device or any identification address in cases of messengers, Skype and that kind of relevant calling programs and providers.

(f) Checking in said remote server whether said another phone number is listed in the remote server as a phone number on an urgent mode.

(g) In response to a positive result of this checking, the method sends a notice to the caller mobile device that includes notification that the callee prefers to receive now only urgent voice calls.

(h) Enabling the caller of the voice call whether to complete the voice call according to his sole discretion.

(i) In response to such decision to complete the voice call, the method sends command from the remote server to the callee mobile device (1) for enabling the operation of the alerts mechanisms (3) of the callee mobile device (1) and by that enabling the callee to be aware to the incoming voice call.

The method also may include the following feature: When the caller mobile device does not include the method, then when this caller performs a voice call to the callee, the method sends to the caller mobile device a message that the callee using this method and recommends the caller to download it for enabling him to complete the voice call, a future voice calls and also for his own use.

The term "completed" in this connection and also in the claims means that the alerts mechanisms (3) of the callee mobile device (1) will operate in response to the incoming voice call, basically in the normal way when the method is on no-active mode, for example, ringing, vibrating and activating the screen with light and information regarding the incoming call.

The notice informs the caller that the callee prefers to receive now only urgent voice calls and this notice may include the time period that the callee sets. As explained above, the method enables the caller to complete the voice call according to his own discretion, assuming that he will act according the notice.

For completing the voice call the method may enables the caller to complete the voice call by pressing on a specific button, on the screen or on the keyboard of his mobile device, to say a specific word and any other way that users activates features by their mobile devices.

The method may provide the users with an option to select the notice out of several optional notices. The method may also provide the users an option to compose a notice. The notice may include the time period in which the callee prefers to receive only voice calls in specific matters.

The method enables the callee to define times in which he wishes to receive only urgent voice calls. The method also may include the option to define geographical locations in which the callee will receive only urgent voice calls, by using the GPS features and the map programs of the mobile device. The callee may set the method that it will be activated automatically anytime he is in a certain territory, for example, in the school yard of his children, in the park, in the sport club, the church and other places in which the callee prefer to be in a rest from not-urgent voice calls.

The notice may be presented on the caller mobile device as a vocalic notice, as a text message, or displayed on the mobile device. As explained above, the user may select the notice from several options or to compose one or more as he or she wishes, for example: "If it is urgent press 1 and I will receive the call immediately, otherwise, please call me after 16:00"; "I am now in a movie until 21:00, if urgent, press 1 and I will answer"; "I am in a meeting, David or Ruth, press 1 and I will answer, all the others please call after 13:00"; "Trying to sleep early today, urgent matters press 1, otherwise please try tomorrow". The method may also enable the user to determine in advance that the time period will be presented continuously in specific days and times.

FIG. 1 is a block diagram that shows two mobile devices (200) that one of them is the callee mobile device (1) and the second one is the caller mobile device (2). The dotted lines between the remote server (100) and the mobile devices (200) refer to internet communication and the dotted line between these two mobile devices (1) and (2) refer to a cellular communication in case of a cellular voice call.

The method that is described above, is the first embodiment of the method subject matter of the present patent application, and this first embodiment method includes in fact a parallel communication between the callee mobile device and the caller mobile device: the direct communication of the cellular connection, in case of a cellular voice call, or over the internet in case of a Skype, messenger, WhatsApp voice call or any kind of phone service provider over internet, and the internet communication between these mobile devices through the remote server as part of the operation of the method. By that, the execution of the first embodiment of the method does not require the cooperation of the phone service providers companies or the mobile devices manufacturers.

The second embodiment of the method subject matter of the present patent application may be executed, for example, by the manufacturers of mobile devices which may install the method as a built-in program in the processor devices in the mobile devices. The second embodiment of the method performed by a processing device (10) running on the mobile device (200) of the user, and includes the following features:

(a) Enabling the user of a mobile device (11) to manage incoming voice calls to his mobile device by enabling the user to activate the method on his mobile device for a period of time that he sets.

(b) In response to the activation of the method on the mobile device, the method preventing the operation of the alerts mechanisms (3) of the mobile device (11) during this period of time.

(c) Storing the information regarding this period of time in the processing device (10) in the mobile device (11).

(d) In response to an incoming voice call from another phone device (22) during said period of time, the method sends a notice to the another phone device that includes notification that the user prefers to receive now only urgent voice calls.

(e) Enabling the caller of said incoming voice call whether to complete the incoming voice call according to his sole discretion.

(f) In response to a decision to complete this incoming voice call, the method enables the operation of the alerts mechanisms of the mobile device and by that enabling the user of the mobile device to be aware to this incoming voice call.

Figure 2:
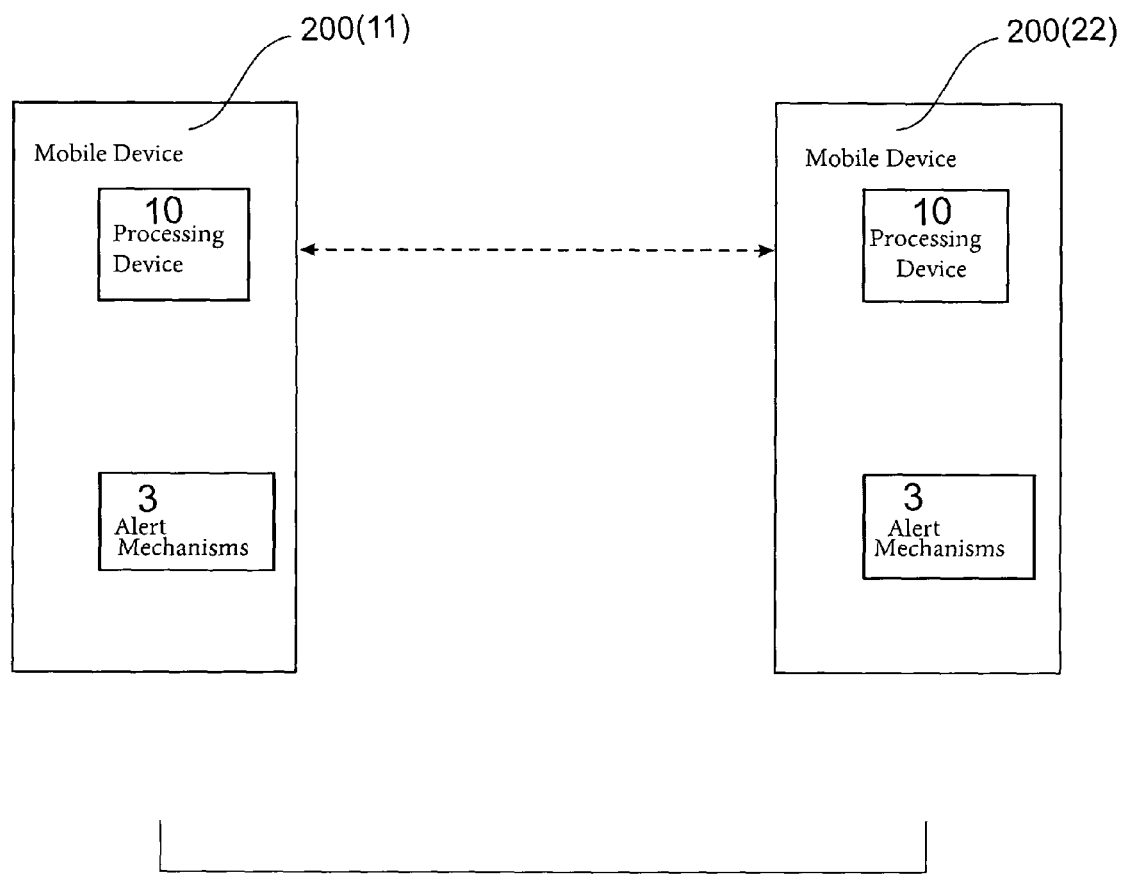
FIG. 2 is a block diagram that shows two mobile devices (200) that one of them is the mobile device (11) and the second one is the other phone device (22).

FIG. 2 is a block diagram that shows two mobile devices (200) that one of them is the mobile device (11) and the second one is the other phone device (22).

The third embodiment of the method subject matter of the present patent application can be executed, for example, by the phone service providers, such as telephone companies, cellular service providers, and other kind of phone service providers, which provides programs and services of voice calls over the internet, such as Skype, Viber, ahatsApp, Messenger, which may run the method on their computers. We will refer to all these kinds of voice call service providers in the application and in the claims as "phone service providers". The third embodiment of the method which performed by processing device running on the computer (500) of the phone service provider, comprising:

(a) Enabling each subscriber of the phone service provider to manage incoming voice calls to his phone number.

(b) Enabling the subscriber to establish a communication with said computer for activating the method regarding his phone number for a period of time that he sets.

(c) In response to the activation, the method disabling for said period of time transmissions of incoming voice calls to the phone number of this subscriber.

(d) Storing in the computer the information regarding the phone number of the subscriber and listing for said period of time this phone number as a phone number on an urgent mode.

(e) Checking the incoming voice calls to subscribers of the phone service provider to find out whether one or more of these incoming voice calls are directed to this phone number of this subscriber.

(f) In response to an incoming voice call to this phone number of the subscriber while said phone number is listing as on urgent mode, the method sends a notice to the mobile device (520) of the caller of this incoming voice call that includes notification that this subscriber prefers to receive now only urgent voice calls.

(g) Enabling the caller whether to complete this incoming voice call according to his sole discretion.

(h) In response to such decision of said caller to complete the incoming voice call, the method enables transmission of this incoming voice call to the phone number of this subscriber and by that his phone device (510) may alerts.

Figure 3:
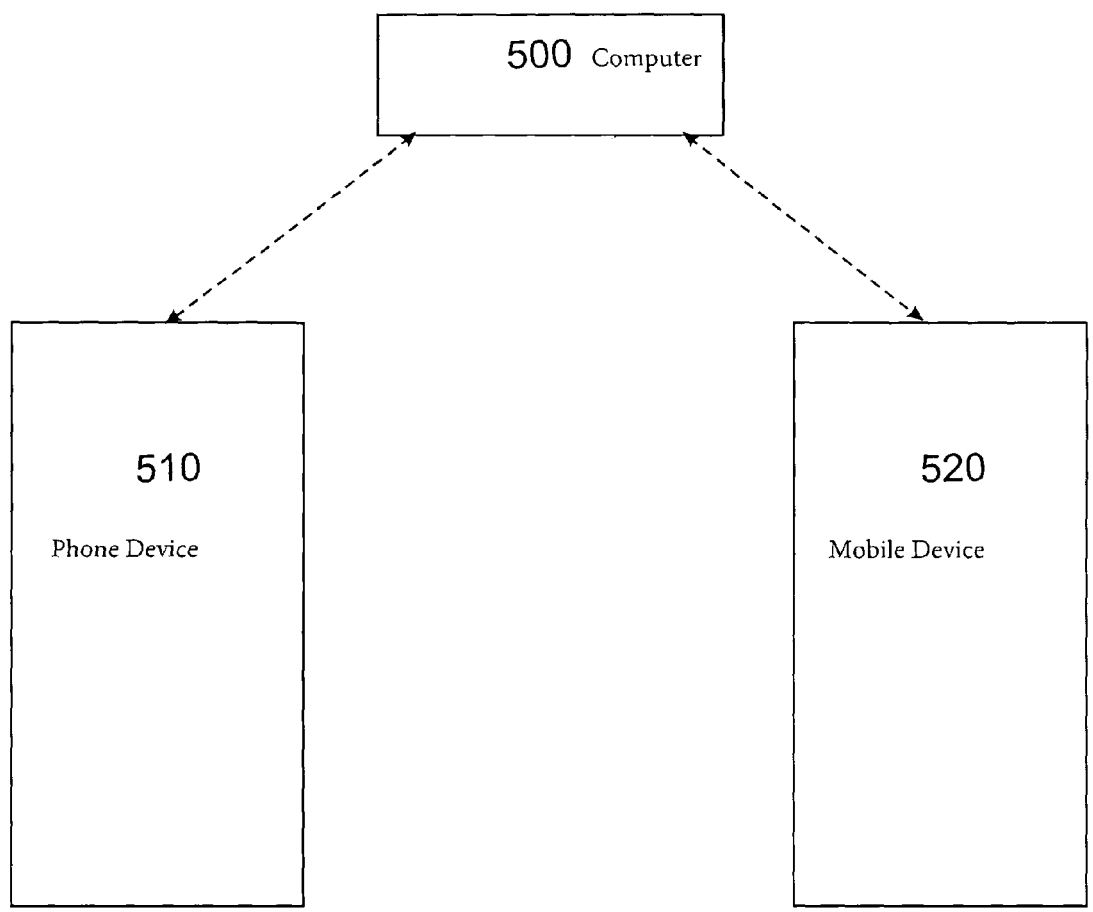
FIG. 3 is a block diagram that shows the computer (500) of the phone service provider, the mobile device (520) and the phone device (510).

FIG. 3 is a block diagram that shows the computer (500) of the phone service provider, the mobile device (520) and the phone device (510).

What is claimed is:

1. A method performed by processing devices running on a callee mobile device, a caller mobile device and a remote server, comprising:

enabling a callee of said callee mobile device to activate the method regarding said callee mobile device for a period of time that said callee sets;

in response to said activation of the method regarding said callee mobile device, preventing operation of alerts mechanisms of said callee mobile device during said period of time;

in response to said activation of the method regarding said callee mobile device, sending to said remote server information regarding a phone number of said callee mobile device and regarding said period of time;

storing in said remote server said information regarding said phone number of said callee mobile device and listing for said period of time said phone number as a phone number on an urgent mode;

in response to execution of a voice call from said caller mobile device to another phone number, sending from said caller mobile device to said remote server information regarding said another phone number;

checking in said remote server whether said another phone number is listed in said remote server as said phone number on an urgent mode;

in response to a positive result of said checking, sending a notice to said caller mobile device, said notice includes notification that said callee prefers to receive now only urgent voice calls;

enabling a caller of said voice call from said caller mobile device to complete said voice call according to his sole discretion;

in response to completion of said voice call, sending command from said remote server to said callee mobile device for enabling the operation of said alerts mechanisms of said callee mobile device and whereby enabling said callee to be aware to said voice call;

whereby enabling said callee to manage incoming voice calls to said callee mobile device in a way that said incoming voice calls will not activate said alerts mechanisms of said callee mobile device but only as a result of said completion of said voice call.

2. A method performed by a processing device running on a mobile device, comprising:

enabling a user of said mobile device to manage incoming voice calls to said mobile device by enabling said user to activate the method on said mobile device for a period of time that said user sets;

in response to said activation of the method on said mobile device, preventing operation of alerts mechanisms of said mobile device for said period of time;

storing information regarding said period of time in said processing device in said mobile device;

in response to incoming voice call from another phone device during said period of time, sending a notice to said another phone device, said notice includes notification that said user prefers to receive now only urgent voice calls;

enabling a caller of said incoming voice call to complete said incoming voice call according to his sole discretion;

in response to completion of said incoming voice call, enabling the operation of said alerts mechanisms of said mobile device, whereby enabling said user of said mobile device to be aware to said incoming voice call;

whereby enabling said user to manage said incoming voice calls to said mobile device in a way that said incoming voice calls will not activate said alerts mechanisms of said mobile device but only as a result of said completion of said incoming voice call.

3. A method performed by a processing device running on a computer of a phone service provider, comprising:

enabling subscriber of said phone service provider to manage incoming voice calls to his phone number;

enabling said subscriber to establish a communication with said computer for activating the method regarding said phone number for a period of time that said subscriber sets;

in response to said activation, disabling for said period of time transmissions of said incoming voice calls to said phone number;

storing in said computer said information regarding said phone number of said subscriber and listing for said period of time said phone number as a phone number on an urgent mode;

checking incoming voice calls to subscribers of said phone service provider to find out whether one or more of said incoming voice calls to said subscribers are directed to said phone number of said subscriber;

in response to an incoming voice call to said phone number of said subscriber while said phone number is listing as on said urgent mode, sending a notice to a caller of said incoming voice call, said notice includes notification that said subscriber prefers to receive now only urgent voice calls;

enabling said caller to complete said incoming voice call according to his sole discretion;

in response to completion of said incoming voice call, enabling transmission of said incoming voice call to said phone number.

\* \* \* \* \*